(12) United States Patent
Shirota et al.

(10) Patent No.: US 6,399,257 B1
(45) Date of Patent: Jun. 4, 2002

(54) COLOR FILTER MANUFACTURING METHOD, COLOR FILTER MANUFACTURED BY THE METHOD, AND LIQUID CRYSTAL DEVICE EMPLOYING THE COLOR FILTER

(75) Inventors: Katsuhiro Shirota, Kawasaki; Akio Kashiwazaki; Koichiro Nakazawa, both of Yokohama; Masashi Hirose, Machida; Mayumi Yokoyama, Yokohama; Yoshihisa Yamashita, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/518,635

(22) Filed: Mar. 3, 2000

(30) Foreign Application Priority Data

Mar. 10, 1999 (JP) ............................. 11-062623

(51) Int. Cl.$^7$ ..................... G02B 5/20; G02F 1/1335
(52) U.S. Cl. ..................... 430/7; 349/106; 347/106
(58) Field of Search ..................... 430/7; 347/106; 349/106

(56) References Cited

U.S. PATENT DOCUMENTS

| | | | |
|---|---|---|---|
| 5,681,675 A | * 10/1997 | Kurauchi et al. | 430/20 |
| 5,712,064 A | 1/1998 | Miyazaki et al. | 430/7 |
| 5,716,739 A | 2/1998 | Kashiwazaki et al. | 430/7 |
| 5,716,740 A | 2/1998 | Shiba et al. | 430/7 |
| 5,726,724 A | 3/1998 | Shirota et al. | 349/106 |
| 5,736,278 A | 4/1998 | Nakazawa et al. | 430/7 |
| 5,898,208 A | 4/1999 | Miyazaki et al. | 349/106 |
| 5,948,576 A | 9/1999 | Shirota et al. | 430/7 |
| 5,948,577 A | 9/1999 | Nakazawa et al. | 430/7 |

FOREIGN PATENT DOCUMENTS

| | | |
|---|---|---|
| JP | 59-075205 | 4/1984 |
| JP | 63-235901 | 9/1988 |
| JP | 01-217302 | 8/1989 |
| JP | 05-188215 | 7/1993 |
| JP | 05-273410 | 10/1993 |
| JP | 05-288913 | 11/1993 |
| JP | 10-096810 | * 4/1998 |

* cited by examiner

*Primary Examiner*—John A. McPherson
(74) *Attorney, Agent, or Firm*—Fitzpatrick, Cella, Harper & Scinto

(57) ABSTRACT

A color filter manufacturing method comprises the steps of forming, on a substrate, a photosensitive layer that increases or develops hydrophilic property upon irradiation of light; exposing the photosensitive layer to light for patterning to form hydrophilic areas in which hydrophilic property is relatively high and non-hydrophilic areas in which hydrophilic property is lower than the hydrophilic areas; and applying a setting ink to the hydrophilic areas with an ink jet technique, thereby forming colored portions. A color filter includes at least a photosensitive layer formed on a substrate and having hydrophilic areas in which hydrophilic property is increased or developed upon irradiation of light, and colored portions formed on the hydrophilic areas of the photosensitive layer. A liquid crystal device is constructed by using the color filter. The color filter can be manufactured inexpensively with the reduced number of steps while satisfying requisite characteristics. Color mixing, color unevenness and uncolored dots are prevented and a highly reliable color filter is provided.

16 Claims, 6 Drawing Sheets

COLOR FILTER MANUFACTURING METHOD, COLOR FILTER MANUFACTURED BY THE METHOD, AND LIQUID CRYSTAL DEVICE EMPLOYING THE COLOR FILTER

BACKGROUND OF THE INVENTION

1. Field of the Invention

The present invention relates to a color filter suitable for a color liquid crystal display used in color televisions, personal computers, etc., and a method of manufacturing the color filter. The present invention also relates to a liquid crystal device employing the color filter.

2. Description of the Related Art

Recently, needs for liquid crystal displays, in particular, color liquid crystal displays, have shown a strong tendency to increase more and more with development of personal computers, in particular, portable personal computers. However, a cost-cutting is required to achieve more widespread use of those personal computers, and a demand for cutting down the cost of, especially, a color filter, which has a relatively great proportion in total cost, has increased.

Various methods have been hitherto tried to meet such a demand while ensuring requisite characteristics of a color filter, but a method capable of satisfying all of the requisite characteristics has not yet been established. Those conventional methods will be described below.

The first one of widely employed methods is a dyeing method. According to the dyeing method, a water-soluble polymeric material is first applied as a dyeing material to the surface of a glass substrate. The applied polymeric material is patterned into the desired form by photolithography. The resulting pattern is immersed in a dyeing bath to obtain a colored pattern. By repeating the above process three times, color filter layers of R (red), G (green) and B (blue) are formed.

Japanese Patent Laid-Open No. 5-288913 discloses another example of the dyeing method. According to the disclosed method, a photosensitive layer is formed on a substrate and exposed to light for patterning. An unexposed portion of the photosensitive layer is then dyed. By repeating the above process three times, a color filter having a three-layered structure of three colors, i.e., R, G and B, is manufactured.

Further, Japanese Patent Laid-Open No. 5-188215 and No. 5-273410 disclose a method of fabricating a color filter of R, G and B by using a polysilane layer as a color filter forming layer and repeating exposure for patterning three times.

The second one is a pigment dispersion method that has been more commonly used instead of the dyeing method in recent years. According to the pigment dispersion method, a photosensitive resin layer containing a pigment dispersed therein is first formed on a substrate, and a pattern of a single color is then obtained by patterning the photosensitive resin layer. By repeating the above process three times, color filter layers of R, G and B are formed.

The third one is an electrodeposition method. According to the electrodeposition method, a transparent electrode is first formed on a substrate by patterning, and the substrate is immersed in an electrodeposition coating solution including a pigment, a resin, an electrolyte, etc., thereby electrodepositing a first color layer. Color filter layers of R, G and B are formed by repeating the above process three times, and are finally fired.

According to the fourth method, a pigment is dispersed in a thermosetting resin, and printing is repeated three times using the resulting resin to separately coat resin layers of R, G and B. The resin is then thermally set to form colored layers. Additionally, in any case employing the above-described methods, it is usual to form a protective layer on the colored layers.

A point common to the above conventional methods is that the same process must be repeated three times to form three colored layers of R, G and B, and a production cost is increased correspondingly. This raises such a common problem that yield is reduced due to an increased number of steps. Further, the electrodeposition method is not suitable for manufacture of TFT displays because pattern shapes capable of being formed by the electrodeposition method are limited in the current state of art. In addition, the printing method is difficult to form a fine pitch pattern because of poor resolution.

To compensate for the above-described drawbacks of the conventional methods, Japanese Patent Laid-Open No. 59-75205, No. 63-235901 and No. 1-217302 disclose methods of manufacturing color filters using the ink jet technique, but a satisfactorily feasible method has not yet been realized.

SUMMARY OF THE INVENTION

An object of the present invention is to provide a color filter manufacturing method which can manufacture a color filter inexpensively with the reduced number of steps while satisfying requisite characteristics of the color filter, e.g., heat resistance, resistance to solvent and resolution, as with conventional methods. Another object of the present invention is to provide a highly reliable color filter manufactured by the above method, and a liquid crystal device constructed by using the color filter.

More specifically, the present invention is intended to prevent color mixing, color unevenness and uncolored dots which may occur in forming colored portions using the ink jet technique, and to provide a color filter with high reliability.

The above objects of the present invention are achieved with features as follows.

A color filter manufacturing method according to the present invention comprises the steps of forming, on a substrate, a photosensitive layer that increases or develops hydrophilic property upon irradiation of light; exposing the photosensitive layer to light for patterning to form hydrophilic areas in which hydrophilic property is relatively high and non-hydrophilic areas in which hydrophilic property is lower than the hydrophilic areas; and applying a setting ink to the hydrophilic areas with an ink jet technique, thereby forming colored portions.

A color filter according to the present invention includes at least a photosensitive layer formed on a substrate and having hydrophilic areas in which hydrophilic property is increased or developed upon irradiation of light, and colored portions formed on the hydrophilic areas of the photosensitive layer.

A liquid crystal device according to the present invention comprises a liquid crystal held between a pair of substrates, one of the substrates being constituted by using the color filter of the present invention.

DESCRIPTION OF THE PREFERRED EMBODIMENTS

Figure 1A:
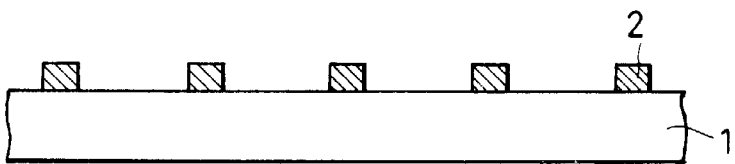
FIGS. 1A to 1F show successive manufacture steps according to one embodiment of a color filter manufacturing method of the present invention.
Figure 1B:
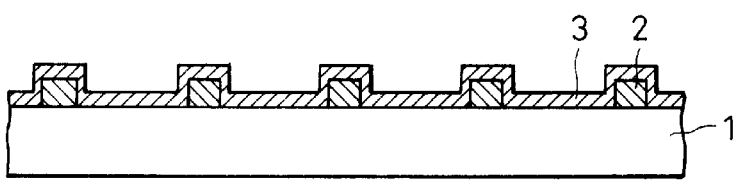
Figure 1C:
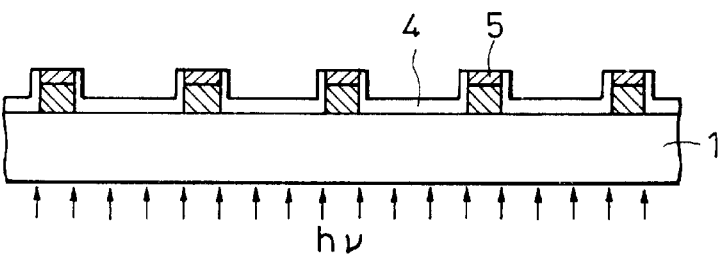
Figure 1D:
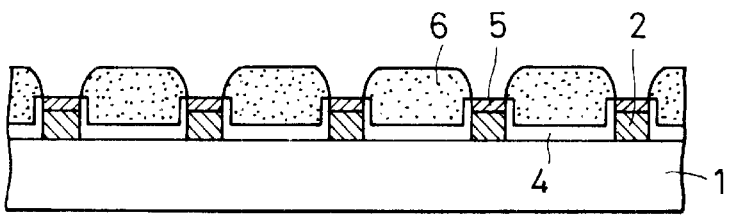
Figure 1E:
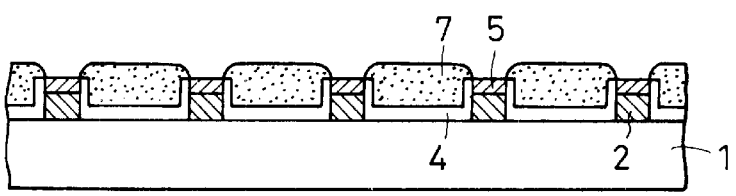
Figure 1F:
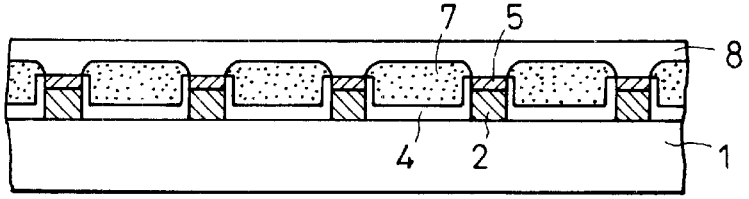
Figure 2A:
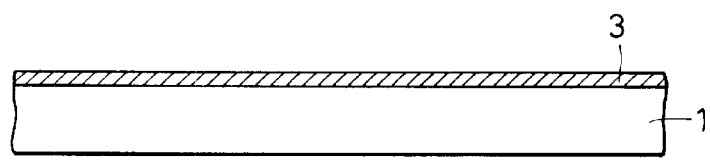
FIGS. 2A to 2E show successive manufacture steps according to another embodiment of the color filter manufacturing method of the present invention.
Figure 2B:
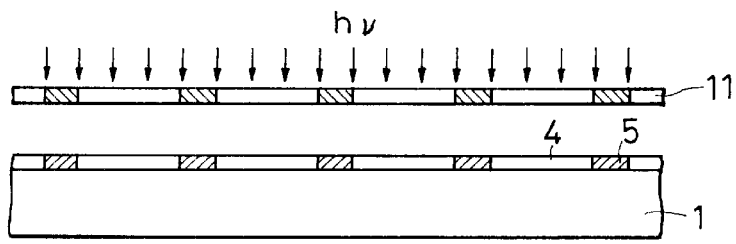
Figure 2C:
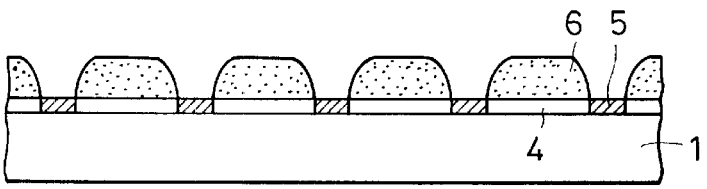
Figure 2D:
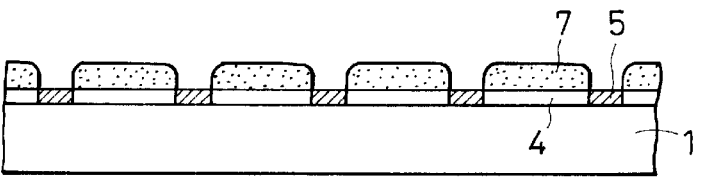
Figure 2E:
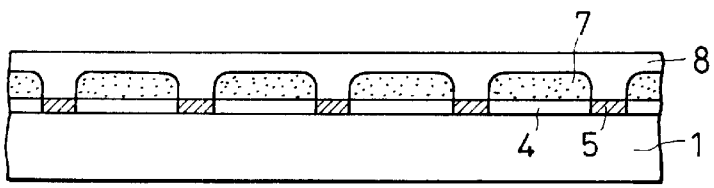

The present invention will be described below in detail in connection with preferred embodiments.

FIGS. 1A to 1F schematically show successive manufacture steps according to one embodiment of a color filter manufacturing method of the present invention. This embodiment represents a method of forming a light-shielding layer, forming a photosensitive layer on the light-shielding layer, and forming colored portion on the photosensitive layer. The successive steps of the color filter manufacturing method according to this embodiment will be described with reference to FIG. 1. Note that FIGS. 1A to 1F are sectional views corresponding respectively to the following steps a to f.

Step-a

A light-shielding layer 2 having openings is formed on a substrate 1. The substrate 1 employed in the present invention usually comprises a glass substrate, but may comprise a plastic substrate or the like so long as it satisfies requisite characteristics, e.g., transparency and mechanical strength, which are required when a liquid crystal device is constructed by using the substrate.

The light-shielding layer 2 is constituted by a light-shielding member, usually called a black stripe or black matrix, which is patterned into the line or lattice form. For example, the light-shielding layer 2 can be formed by patterning a vapor deposition layer of a metal such as chromium, a photosensitive black resin layer or the like with photolithography. In this embodiment, a relatively thick light-shielding layer is formed by using a black resin or the like for the purpose of rendering the light-shielding layer 2 to serve as a partition when a setting ink is applied as described later. Where the light-shielding layer 2 is made of a metal, the layer thickness is preferably in the range of 0.05 to 0.3 $\mu$m. Where the light-shielding layer 2 is made of a resin, the layer thickness is preferably in the range of 0.1 to 3.0 $\mu$m.

Step-b

A photosensitive layer 3 is formed on the entire surface of the substrate 1 having the light-shielding layer 2 formed thereon. The photosensitive layer 3 used in the present invention is a layer increasing or developing hydrophilic property upon irradiation of light, and preferably contains, as a photosensitive compound, at least one selected from $Ti_3O$, $SnO_2$, ZnO, $WO_3$, $SrTiO_3$, $Bi_2O_3$ and $Fe_2O_3$. When light is irradiated to the photosensitive layer 3 formed using such a photosensitive compound, electrons and holes excited and produced upon the irradiation of light react with oxygen and water, which are adsorbed on the surface of the photosensitive compound, to produce active oxygen, whereby the surface of an area subjected to the irradiation of light becomes hydrophilic. On the other hand, the metal oxide inherently has water- and oil-repellent property. The surface of an area not subjected to the irradiation of light therefore does not develop hydrophilic property, and tends to become ink repelling. Accordingly, when a setting ink is applied with the ink jet technique as described later, areas not subjected to the irradiation of light (i.e., hydrophobic areas) repel the ink and develop the function of preventing color mixing between adjacent ones of the areas subjected to the irradiation of light (i.e., hydrophilic areas). As a result, inks of different colors are avoided from mixing with each other (including color mixing due to migration of color materials).

As practical examples, the photosensitive layer 3 can be formed using the above-mentioned photosensitive compound as follows. According to one method, the photosensitive compound is sintered on the substrate under heating to a high temperature (i.e., under heating over the crystallization temperature). According to another method, a composition prepared by dispersing alkoxysilane and the photosensitive compound in an alcohol solvent or the like is coated over both the substrate 1 and the light-shielding layer 2. The composition is then heated for firing.

The above former sintering method requires heating to a high temperature not lower than 400° C., and is not preferable due to a risk that the light-shielding layer 2 formed on the substrate 2 may thermally deteriorate when the light-shielding layer is made of raw materials containing a resin material as a primary one. Also, even where the light-shielding layer 2 is made of a metal material such as chromium, the sintering method is not preferable for the reason that the light-shielding layer is apt to go out of proper dimensional accuracy under heating to a high temperature. In the present invention, therefore, the above latter method of coating and then firing the composition is preferably employed because the latter method can form the photosensitive layer at a lower temperature.

By exposing the thus-formed photosensitive layer 3 to light for patterning, water molecules, etc. are adsorbed in exposed portions and hydrophilic property of the exposed portion is increased. The wavelength of light used in the exposure for patterning can be optimally selected depending on the kind of used photosensitive compound in view of the fact that some photosensitive compound is sensitive only to light having a relatively short wavelength in the ultraviolet region, while another photosensitive compound is sensitive to even visible light having a relatively long wavelength. In particular, however, it is preferable to employ the photosensitive compound made of a material that is sensitive only to ultraviolet light. The reason is as follows. Even after a liquid crystal device is completed, backlight or extraneous light (such as sunlight) entering from a panel front surface is always irradiated to openings in the light-shielding layer 2 through a polarizing film. Accordingly, the light is also irradiated to unexposed portions, thus resulting in a possibility that depending on the type of used coloring material, the coloring material may decompose and fade by a photosensitive compound produced upon light excitation on the surface of the photosensitive layer.

Usually, a polarizing plate (or a polarizing film) provided outside the liquid crystal device cuts off ultraviolet rays. By forming the photosensitive layer of a material that is sensitive only to light in the ultraviolet region, therefore, the unexposed portions of the photosensitive layer are surely kept from developing photosensitivity after the liquid crystal device is completed, and the above-mentioned problem is avoided. On the other hand, where the photosensitive layer is made of a material that is sensitive to light having a wavelength shorter than 300 nm, the exposure for patterning of the photosensitive layer from the rear side of a glass substrate, as described later, is infeasible. For those reasons, the sensitive wavelength region of the photosensitive layer used in the present invention is preferably in the range of 300 to 400 nm. Examples of the photosensitive compound, which is sensitive only to light of the above wavelength region, include anatase type titania (sensitive to light of wavelength not longer than 387 nm), $SnO_2$ (sensitive to light of wavelength not longer than 344 nm), ZnO (sensitive to light of wavelength not longer than 387 nm), and so on.

In the step of forming the photosensitive layer 3, the above-mentioned composition can be coated by any of various methods such as spin coating, roll coating, bar coating, spray coating, and dip coating.

The thickness of the photosensitive layer 3 is preferably in the range of 0.01 to 10 μm, more preferably in the range of 0.01 to 5 μm.

Step-c

The photosensitive layer 3 is exposed to light from the rear side of the substrate 1, whereby hydrophilic areas 4 in which hydrophilic property is increased or developed are formed in exposed portions. Unexposed portions have hydrophilic property lower than the hydrophilic areas 4, and are referred to as non-hydrophilic areas 5 in the present invention for the sake of convenience. In this embodiment, since the photosensitive layer 3 is formed on the light-shielding layer 2 formed on the substrate 1, the photosensitive layer 3 can be exposed to light with the light-shielding layer 2 serving as a mask. To prevent uncolored dots (i.e., voided dots occurred at the boundary between the colored portion and the light-shielding layer) of a color filter, it is desired that the colored portion be formed over an area wider than the opening in the light-shielding layer 2. To this end, the photosensitive layer 3 must be exposed to light over an area wider than the opening in the light-shielding layer 2. Concretely, divergent light is preferably employed as irradiation light in the exposure step. As an alternative, it is also effective to perform overexposure to spread an area in which the reaction occurs.

Figure 3A:
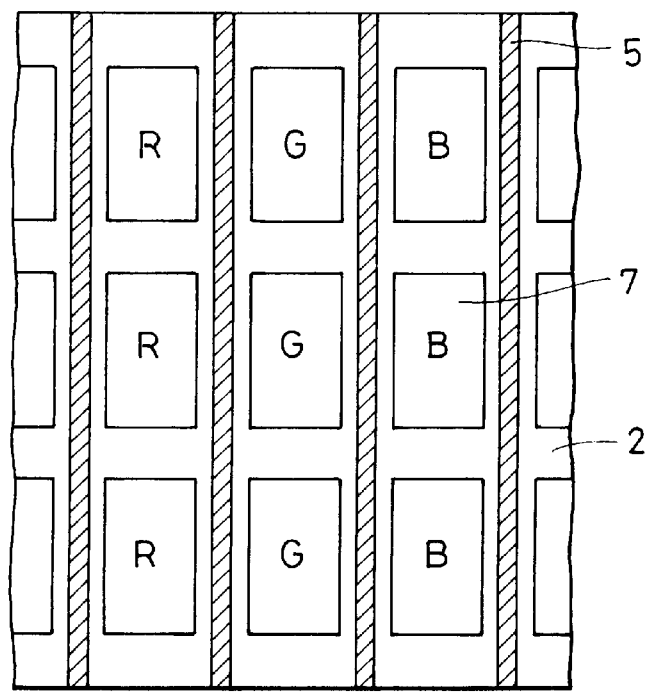
FIGS. 3A and 3B are each schematic plan views of a preferable example of arrangement of a color filter according to the present invention.
Figure 3B:
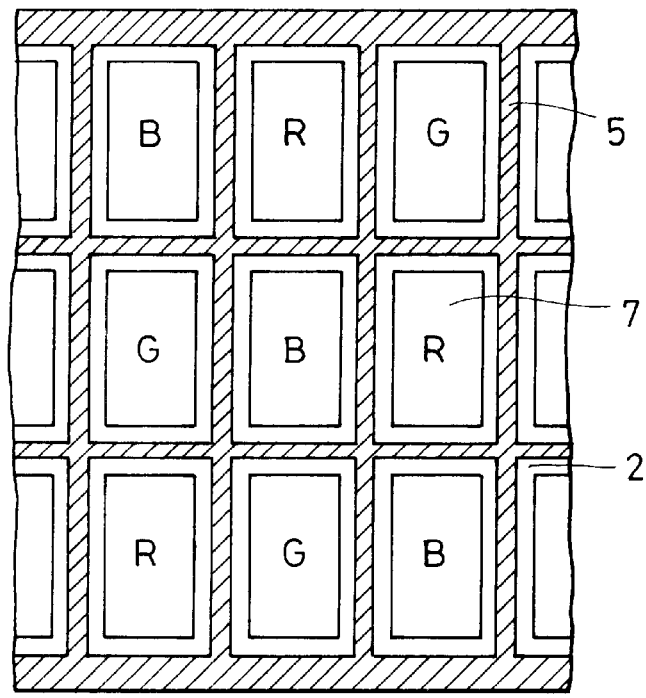
Figure 4A:
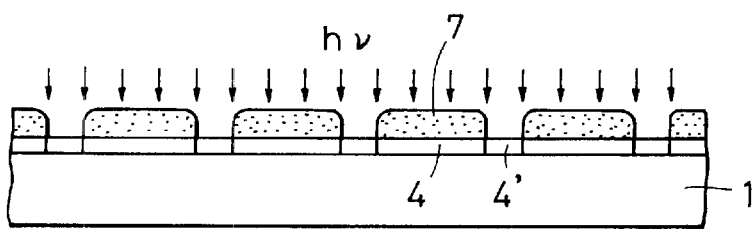
FIGS. 4A to 4D show successive manufacture steps according to still another embodiment of the color filter manufacturing method of the present invention.
Figure 4B:
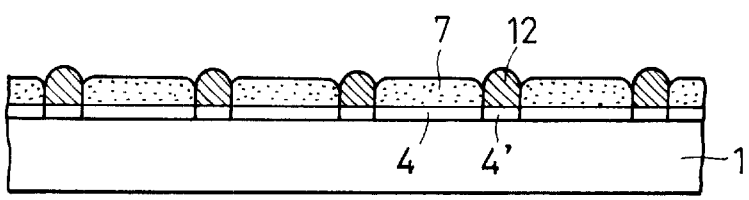
Figure 4C:
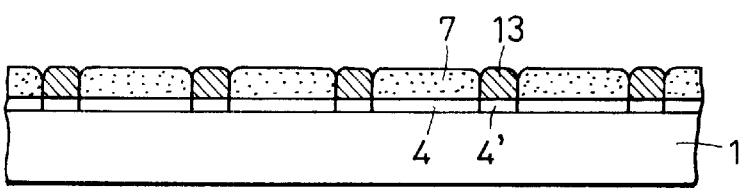
Figure 4D:
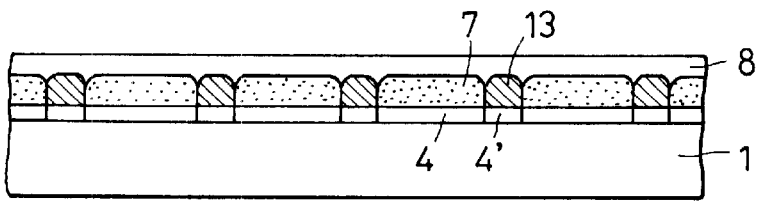
Figure 5A:
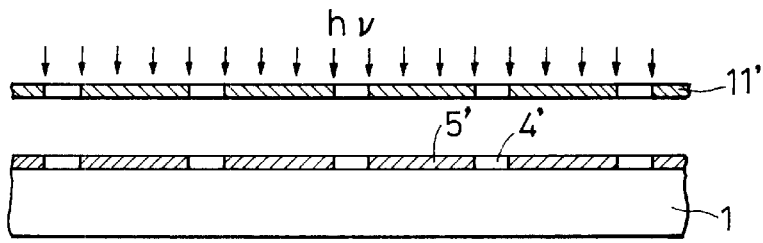
FIGS. 5A to 5G show successive manufacture steps according to still another embodiment of the color filter manufacturing method of the present invention.
Figure 5B:
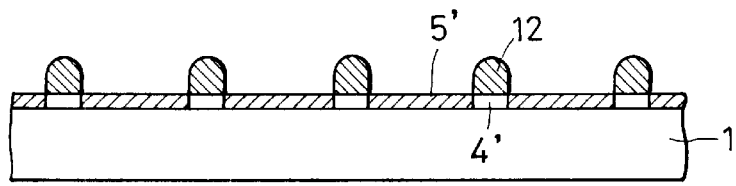
Figure 5C:
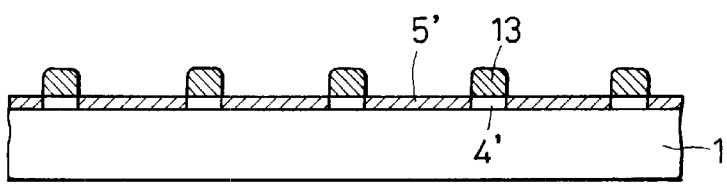
Figure 5D:
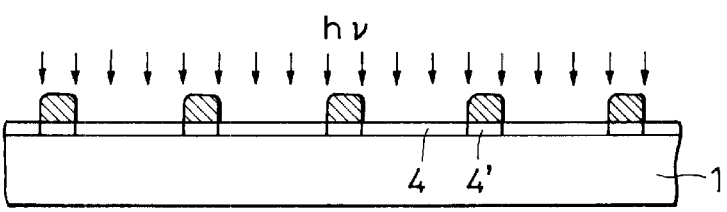
Figure 5E:
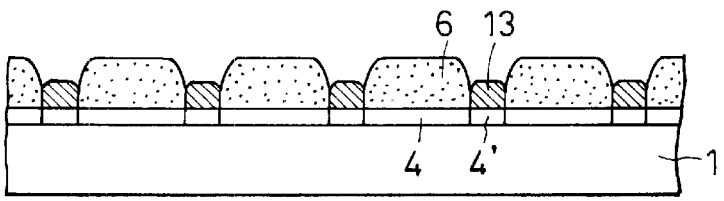
Figure 5F:
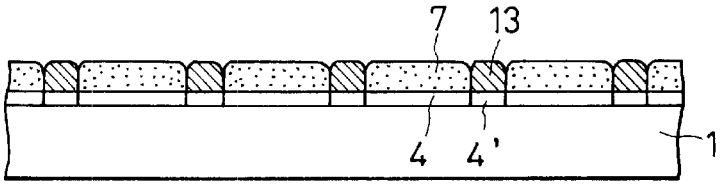
Figure 5G:
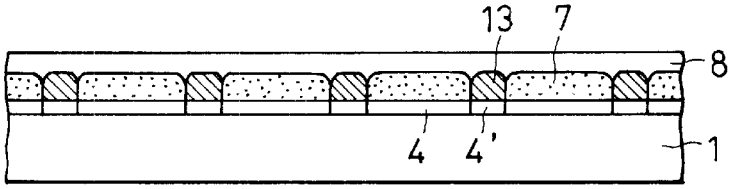

While the photosensitive layer 3 is exposed to light from the rear side of the substrate in this embodiment, the exposure light may be introduced from the front side of the substrate by using a photomask. In such a case, a mask having a wider opening than that of the light-shielding layer 2 is preferably employed for preventing the occurrence of uncolored dots. More specifically, it is preferable that the unexposed portion is formed on the light-shielding layer 2 at a position 3 μm or more inward of an edge of the opening in the light-shielding layer 2. FIGS. 3A and 3B are each schematic plan views of a preferable example of arrangement of a color filter according to the present invention. FIG. 3A shows one example in which the exposure is performed for patterning into the stripe form. In the example of FIG. 3A, an opening is formed in the light-shielding layer 2 for each pixel, but colored portions 7 are formed in the shape of a stripe continuously extending in the row direction. Also, FIG. 3B shows another example in which the exposure is performed for patterning into the matrix form corresponding to the openings in the light-shielding layer 2. In the present invention, the exposure may be performed for patterning into the stripe or matrix form.

Step-d

A setting ink 6 is applied to the hydrophilic areas 4 using the ink jet technique in accordance with a predetermined coloring pattern. As the setting ink 6, inks of three colors, i.e., R, G and B, are usually employed to construct a color filter.

Since the photosensitive layer 3 has low ink absorptivity, the setting ink 6 used in the present invention preferably contains a component bridging upon heating or light irradiation such as a polymer and oligomer, i.e., a binder component. Example of those polymer and oligomer materials include a sole monomer having a structure unit expressed below, and/or a copolymer of the monomer and another vinyl-base monomer:

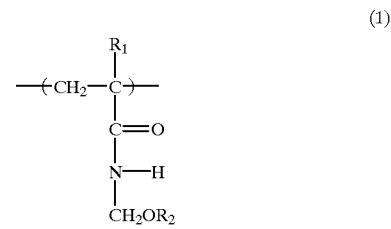

[$R_1$ and $R_2$ are substitution groups that may differ from each other]

Examples of the monomer having the structure unit expressed by the above formula (1) include N-methylol acrylamide, N-methoxymethyl acrylamide, N-ethoxymethyl acrylamide, N-isopropoxymethyl acrylamide, N-methylol methacrylamide, N-methoxymethyl methacrylamide, N-ethoxymethyl methaacrylamide, and so on. However, usable monomers are not limited to the above examples. The above monomers are employed solely or after copolymerization with another vinyl-base monomer. The another vinyl-base monomer may be any of, for example, acrylic acid esters such as acrylic acid, methacrylic acid, acrylic acid methyl, and acrylic acid ethyl; methacrylic acid esters such as methacrylic acid methyl and methacrylic acid ethyl; vinyl-base monomers containing hydroxyl groups such as hydroxylmethyl methacrylate, hydroxylethyl methacrylate, hydroxylmethyl acrylate, and hydroxylethyl acrylate; as well as styrene, α-methylstyrene, acrylamide, methacrylamide, acrylonitrile, allylamine, vinylamine, vinylacetate, and vinylpropionate. As a matter of course, the another vinyl-base monomer is not limited to the above examples.

In consideration of ejection property suitable for the ink jet process, the molecular weight of the above-mentioned bridging compound (binder component) preferably contains a primary component having weight-average molecular weight preferably in the range of 500 to 50000, more preferably in the range of 1000 to 20000. Further, the content of the binder component in the ink is preferably in the range of 0.1 to 15 weight %, more preferably in the range of 1 to 10 weight %.

The setting ink 6 used in the present invention contains a coloring material which may be based on a dye or pigment.

The ink jet technique may be of the bubble jet type employing an electro-thermal transducer as an energy generating device, or of the piezo jet type employing a piezoelectric device as an energy generating device. A colored area and a coloring pattern can be optionally set.

Step-e

The setting ink 6 is set with necessary treatment, such as heating or light irradiation, to form colored portions 7 of R, G and B. The colored portions 7 have a thickness preferably in the range of 0.5 to 5.0 µm.

Step-f

A protective layer 8 is formed as needed. The protective layer 8 can be formed of, e.g., a resin layer of photosetting type, thermosetting type or photo- and thermo-setting type, or an inorganic film formed by vapor deposition, sputtering, etc. Thus, the protective layer 8 may be formed of any suitable material so long as it is endurable to subsequent processes of forming an ITO film (transparent electrode) and forming an orientation film, and it has transparency after the color filter including the protective layer 8 is completed.

Next, FIGS. 2A to 2E show another embodiment of the color filter manufacturing method of the present invention in which when a liquid crystal device is completed, a light-shielding layer is formed on an opposing substrate, and not formed on the side of a color filter. In FIGS. 2A to 2E, the same components as those in FIGS. 1A to 1F are denoted by the same numerals, and a description of those components is omitted here. Note that, as with FIGS. 1A to 1F, FIGS. 2A to 2E correspond respectively to the following steps a to e.

Step-a

A photosensitive layer 3 is formed on the entire surface of a substrate 1.

Step-b

The photosensitive layer 3 is exposed to light using a photomask 11 for patterning to form areas in which colored portions are to be formed. Thus, hydrophilic areas 4 and non-hydrophilic areas 5 are formed on the photosensitive layer 3.

Step-c

A setting ink 6 is applied to the hydrophilic areas 4 using the ink jet technique in accordance with a predetermined coloring pattern. Although the surface of the photosensitive layer is flat in this embodiment, the applied setting ink 6 is repelled by the hydrophilic areas 4 that are each positioned between the adjacent hydrophilic areas 4. Therefore, the setting ink 6 remains in the hydrophilic areas 4 where the ink has been applied, and inks of different colors applied to the adjacent hydrophilic areas 4 are prevented from mixing with each other.

Step-d

The setting ink 6 is set with necessary treatment, such as heating or light irradiation, to form colored portions 7 of R, G and B.

Step-e

A protective layer 8 is formed as needed.

Next, manufacture steps of still another embodiment, in which a light-shielding layer is formed in a similar manner as colored portions, will be described with reference to FIGS. 4A to 4D. Note that FIGS. 4A to 4D correspond respectively to the following steps a to d.

Step-a

The steps a to d in FIG. 2 are carried out. Then, the entire surface of a substrate 1 having colored portions 7 formed thereon is exposed to light for converting a non-hydrophilic area positioned between the adjacent colored portions 7 into a hydrophilic area 4'.

Step-b

A black setting ink 12 is applied to the hydrophilic areas 4'. The setting ink 12 used in this step is the same as the setting ink 6 used for forming the colored portions 7 except for color, i.e., except that the setting ink 12 is black.

Step-c

The black setting ink 12 is set with necessary treatment, such as heating or light irradiation, to form a light-shielding layer 13.

Step-d

A protective layer 8 is formed as needed.

While the light-shielding layer 13 is formed after forming the colored portions 7 in the above embodiment, the steps of forming the light-shielding layer 13 and the colored portions 7 may be reversed in the order. Such a modified embodiment is shown in FIGS. 5A to 5G. In FIGS. 5A to 5G, the same components as those in FIGS. 1 to 4 are denoted by the same numerals. Note that FIGS. 5A to 5G correspond respectively to the following steps a to g.

Step-a

A photosensitive layer is formed on the entire surface of a substrate 1 similarly to the step-a in FIG. 2. Then, the photosensitive layer is exposed to light for patterning using a photomask 11' having openings in which a light-shielding layer is to be formed, thereby forming hydrophilic areas 4' and non-hydrophilic areas 5'.

Step-b

A black setting ink 12 is applied to the hydrophilic areas 4' using the ink jet technique.

Step-c

The black setting ink 12 is set with necessary treatment, such as heating or light irradiation, to form a light-shielding layer 13.

Step-d

The entire surface of the substrate 1 is exposed to light for converting the non-hydrophilic areas 5' into hydrophilic areas 4.

Step-e

A setting ink 6 having each of colors R, G and B is applied to the hydrophilic areas 4 in accordance with a predetermined coloring pattern.

Step-f

The setting ink 6 is set with necessary treatment, such as heating or light irradiation, to form colored portions 7 of R, G and B.

Step-g

A protective layer 8 is formed as needed.

With the embodiments shown in FIGS. 4 and 5, since the light-shielding layer and the colored portions are both formed using the ink jet technique, the manufacture process is simplified and the production cost can be remarkably cut down.

Figure 6:
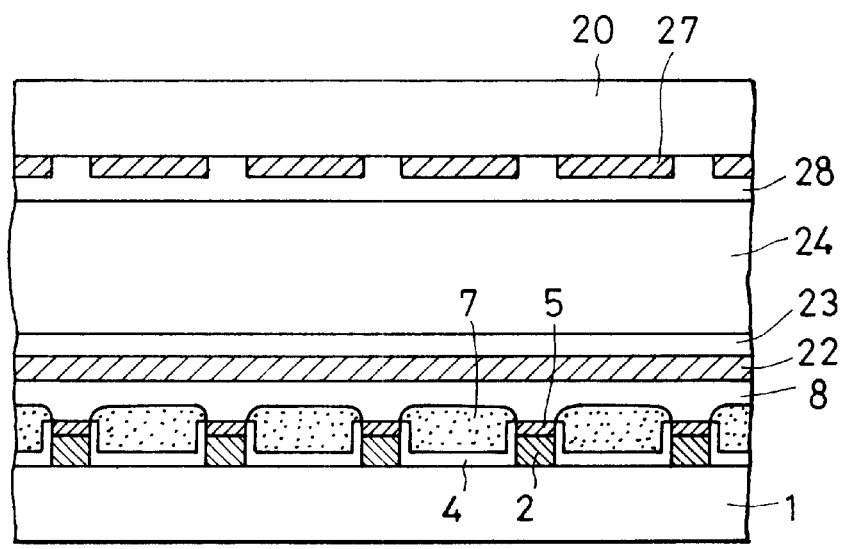
FIG. 6 is a schematic sectional view of one embodiment of a liquid crystal device according to the present invention.
Figure 7:
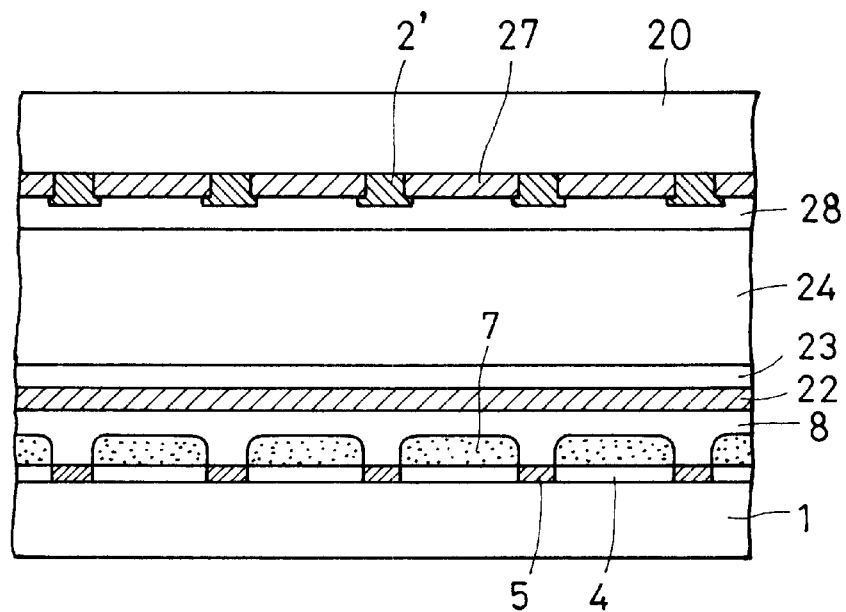
FIG. 7 is a schematic sectional view of another embodiment of the liquid crystal device according to the present invention.

Next, an embodiment of a liquid crystal device according to the present invention will be described, taking as an example a TFT liquid crystal device (i.e., liquid crystal device of active matrix addressing type employing thin-film transistors (TFTs) as active devices) in which the color filter manufactured through the steps shown in each of FIGS. 1 and 2 is incorporated. FIGS. 6 and 7 are schematic sectional views of liquid crystal devices constructed employing the color filters manufactured through the steps shown in FIGS. 1 and 2, respectively. In FIGS. 6 and 7, the same components as those in FIGS. 1 and 2 are denoted by the same numerals, and a description of those components is omitted here.

A liquid crystal device for color display is generally formed by mating a color filter substrate 1 and an opposing substrate 20 with each other and then enclosing a liquid crystal compound 24 between both the substrates. TFTs (not shown) and transparent pixel electrodes 27, which are made of a transparent conductive material such as ITO, are formed in a matrix pattern on the inner side of one substrate 20 of the liquid crystal device, the one substrate 20 being formed of a glass substrate or the like. Also, on the inner side of the other substrate 1, colored portions 7 of the color filter having colors R, G and B are arranged in positions corresponding to the pixel electrodes 27, and an opposing electrode (common electrode) 22 made of a transparent conductive material such as ITO is formed on the colored portions 7. A light-shielding layer 2 is usually formed on the side of the color filter substrate (FIG. 6), but it is formed on the side of the opposing TFT substrate in a liquid crystal device of BM-on-array type (as indicated by 2' in FIG. 7). Further, orientation films 23, 28 are formed respectively on the inner sides of both the substrates, and are subjected to rubbing or the like treatment so that liquid crystal molecules are arrayed in a certain direction. The liquid crystal compound 24 is filled in a gap (2 to 5 μm) between both the substrates. Usually, a polarizing plate (not shown) is bonded to the outer side of each substrate. Then, an image is generally displayed by employing a backlight constituted as a combination of a fluorescent lamp (not shown) and a diffusing plate (not shown), and rendering the liquid crystal compound 24 to function as an optical shutter that changes transmissivity of light illuminated from the backlight. The above-described construction represents one example employed in a transmissive liquid crystal device. In the case of a reflective liquid crystal device, an image is displayed by forming the substrate 20 or the pixel electrodes 27 of a material capable of reflecting light, such as a metal, or providing a reflecting member separately so as to reflect incident light entering from the side of the color filter substrate, and rendering the liquid crystal compound 24 to function as an optical shutter. Additionally, in this case, a polarizing plate is provided only on the light entering side.

It is to be noted that the liquid crystal device of the present invention is not limited to the constructions shown in FIGS. 6 and 7, and conventional techniques for liquid crystal devices can be preferably employed to realize any desired liquid crystal device such as of simple matrix type including stripe-shaped electrodes combined with each other, for example, so long as the device can be constructed using the color filter of the present invention.

EXAMPLES

Example 1

On the glass substrate 1, as shown in FIG. 1, the light-shielding layer 2 with a thickness of 1.0 μm was formed using a photosensitive resin (alkali-soluble negative resist "V259-BK739" made by Nippon Steel Chemical Co. Ltd.) containing carbon black dispersed therein. A composition consisted of 3 weight parts of anatase type titania, 3 weight parts of tetraethoxysilane, and 94 weight parts of isopropylalcohol was coated all over the surface of the substrate by the spray coating method, and then pre-baked at 230° C. for 30 minutes. The photosensitive layer 3 with a thickness of 0.1 μm was thereby formed.

Subsequently, ultraviolet light with the intensity of 2 J/cm$^2$ was irradiated to the photosensitive layer 3 from the rear side of the substrate by using a mercury lamp. As shown in FIG. 3B, areas including openings in the light-shielding layer 2 and extending to the light-shielding layer 2 to some extent were exposed to the light, whereby the hydrophilic areas 4 were formed.

Setting inks of three colors were applied to the hydrophilic areas 4 using an ink jet head. The setting inks contained dyestuffs of R, G and B and, as a binder component, a triad copolymer of N-methylol acrylamide, methacrylic acid methyl and hydroxylethyl methacrylate (copolymerization ratio (molar ratio) of 30:20:50). The inks were set with heat treatment at 90° C. for 5 minutes and then at 230° C. for 30 minutes, whereby the colored portions 7 were formed.

Then, the protective layer 8 was formed by spin-coating a two-liquid thermosetting photosensitive composition ("Optomer SS-6688" made by Japan Synthetic Rubber Co., Ltd.) in film thickness of 1 μm, pre-baking the coated composition at 90° C. for 5 minutes, and then hardening it with heat treatment at 230° C. for 30 minutes.

As a result of observing a color filter thus fabricated by an optical microscope, any defects such as color mixing, color unevenness and uncolored dots were not observed. Further, as shown in FIG. 6, a TFT liquid crystal device was fabricated by forming a common electrode and an orientation film on the color filter, and mating the color filter substrate with an opposing substrate. As a result of operating the TFT liquid crystal device, a highly fine color image was displayed.

Example 2

A color filter was fabricated in the same manner as in Example 1 except that the photosensitive layer was formed using $SnO_2$ instead of anatase type titania. As a result of observing the fabricated color filter by an optical microscope, any defects such as color mixing, color unevenness and uncolored dots were not observed. Further, a TFT liquid crystal device was fabricated by employing the color filter in the same manner as in Example 1. As a result of operating the TFT liquid crystal device, a highly fine color image was displayed.

Example 3

A color filter was fabricated in the same manner as in Example 1 except that the photosensitive layer was formed using ZnO instead of anatase type titania. As a result of observing the fabricated color filter by an optical microscope, any defects such as color mixing, color unevenness and uncolored dots were not observed. Further, a TFT liquid crystal device was fabricated by employing the color filter in the same manner as in Example 1. As a result of operating the TFT liquid crystal device, a highly fine color image was displayed.

Example 4

As shown in FIG. 2, the same composition as used in Example 1 for forming the photosensitive layer was spin-coated on the glass substrate 1 with a film thickness of 0.2 μm in a dried state. The photosensitive layer 3 was formed by baking the coated composition.

Then, the photosensitive layer 3 was exposed to light of the same intensity as in Example 1 for patterning by using the photomask 11 that had wider openings than those in the light-shielding layer to be provided on the opposing substrate. The hydrophilic areas 4 were thereby formed on the photosensitive layer 3. Subsequently, the same setting inks as those used in Example 1 were applied to the hydrophilic areas 4 and then set to form the colored portions 7.

The same protective layer 8 as that in Example 1 was formed on the colored portions 7.

As a result of observing a color filter thus fabricated by an optical microscope, any defects such as color mixing, color unevenness and uncolored dots were not observed. Further, a TFT liquid crystal device as shown in FIG. 7 was fabricated by employing the color filter. As a result of operating the TFT liquid crystal device, a highly fine color image was displayed.

Example 5

After forming the colored portions 7 in the same manner as in Example 4, the entire surface of the substrate was exposed to light, as shown in FIG. 4, for converting the non-hydrophilic areas into the hydrophilic areas 4'. The setting ink 12, which was the same as the setting ink used in Example 1 except for containing a black dyestuff, was applied to the hydrophilic areas 4' using an ink jet head. The setting ink 12 was then set with heat treatment and the surface was cleaned. The light-shielding layer 13 was thereby formed.

The protective layer 8 was formed on both the colored portions 7 and the light-shielding layer 13 in the same manner as in Example 1. As a result of observing a color filter thus fabricated by an optical microscope, any defects such as color mixing, color unevenness and uncolored dots were not observed.

According to the present invention, as described above, a color filter free from color mixing, color unevenness and uncolored dots can be manufactured by a relatively simple method using the ink jet technique with high yield. In other words, a color filter having high reliability can be provided inexpensively. As a result, a liquid crystal device with good color display characteristics can be provided at a lower cost by employing the color filter of the present invention.

What is claimed is:

1. A color filter manufacturing method comprising the steps of:

forming, on a substrate, a photosensitive layer that increases or develops hydrophilic property upon irradiation with light, said photosensitive layer comprising at least one of $TiO_2$, $SnO_2$, $ZnO$, $WO_3$, $SrTiO_3$, $Bi_2O_3$ or $Fe_2O_3$;

exposing said photosensitive layer to light to form a pattern of hydrophilic areas and non-hydrophilic areas, wherein the hydrophilic areas have a hydrophilic property which is higher than in the non-hydrophilic areas; and applying a setting ink to said hydrophilic areas with an ink jet technique, thereby forming colored portions.

2. A color filter manufacturing method according to claim 1, wherein said photosensitive layer further comprises alkoxysilane.

3. A color filter manufacturing method according to claims 1 or 2, further comprising, after the step of coloring said colored portions, the step of:

exposing said non-hydrophilic areas to light for conversion into hydrophilic areas; and applying a black setting ink to said hydrophilic areas with an ink jet technique, thereby forming a light-shielding layer.

4. A color filter manufacturing method according to claims 1 or 2, further comprising, prior to the step of exposing said photosensitive layer to light for patterning to form areas in which said colored portions are to be formed, the steps of:

exposing said photosensitive layer to light while shielding the areas in which said colored portions are to be formed, thereby forming hydrophilic areas and non-hydrophilic areas; and applying a black setting ink to said hydrophilic areas with an ink jet technique, thereby forming a light-shielding layer.

5. A color filter manufacturing method according to claims 1 or 2, further comprising, prior to the step of forming said photosensitive layer, the steps of forming, on said substrate, a light-shielding layer having openings and forming colored portions at least in the openings.

6. A color filter manufacturing method according to claim 5, wherein said photosensitive layer is exposed to light from the rear side of said substrate by using said light-shielding layer as a mask.

7. A color filter manufacturing method according to claim 6, wherein the setting ink is applied to the openings in said light-shielding layer while said light-shielding layer serves as a partition.

8. A color filter manufacturing method according to claim 5, wherein the setting ink is applied to the openings in said light-shielding layer while said light-shielding layer serves as a partition.

9. A color filter manufacturing method according to claim 5, wherein said hydrophilic areas are formed to be wider than the openings in said light-shielding layer.

10. A color filter comprising a photosensitive layer formed on a substrate and having hydrophilic areas in which hydrophilic property is increased or developed upon irradiation of light, and colored portions formed on the hydrophilic areas of the photosensitive layer, said photosensitive layer comprising at least one of $Ti_3O$, $SnO_2$, $ZnO$, $WO_3$, $SrTiO_3$, $Bi_2O_3$ or $Fe_2O_3$.

11. A color filter according to claim 10, wherein a light-shielding layer is formed on said substrate, and non-hydrophilic areas of said photosensitive layer are formed on said light-shielding layer.

12. A color filter according to claim 10, wherein said photosensitive layer is entirely formed as a hydrophilic area, and said light-shielding layer is formed on said photosensitive layer between adjacent colored portions.

13. A color filter according to claim 10, wherein said photosensitive layer is in the form of black stripes or a black matrix.

14. A color filter according to any one of claims 10 to 13, wherein a protective layer is formed on said colored portions.

15. A liquid crystal device comprising a liquid crystal held between a pair of substrates, one of said substrates being constituted by using a color filter according to claim 14.

16. A liquid crystal device comprising a liquid crystal held between a pair of substrates, one of said substrates being constituted by using a color filter according to any one of claims 10 to 13.

* * * * *

UNITED STATES PATENT AND TRADEMARK OFFICE
CERTIFICATE OF CORRECTION

PATENT NO.   : 6,399,257 B1
DATED        : June 4, 2002
INVENTOR(S)  : Katsuhiro Shirota et al.

It is certified that error appears in the above-identified patent and that said Letters Patent is hereby corrected as shown below:

Column 4,
Line 31, "substrate 2" should read -- substrate 1 --.

Column 6,
Line 10, "Example" should read -- Examples --.

Column 11,
Line 43, "coloring" should read -- forming --.

Signed and Sealed this

Twelfth Day of November, 2002

Attest:

Attesting Officer

JAMES E. ROGAN
Director of the United States Patent and Trademark Office